(12) United States Patent
Petruchik

(10) Patent No.: US 6,356,323 B1
(45) Date of Patent: Mar. 12, 2002

(54) COLOR DISPLAY USING CHOLESTERIC LIQUID CRYSTALS

(75) Inventor: Dwight J. Petruchik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/637,133

(22) Filed: Aug. 11, 2000

(51) Int. Cl.$^7$ .............................................. G02F 1/1347
(52) U.S. Cl. .............................. 349/74; 349/77; 349/78; 349/81; 349/82
(58) Field of Search .............................. 349/74, 77, 78, 349/81, 82

(56) References Cited

U.S. PATENT DOCUMENTS

| | | | |
|---|---|---|---|
| 3,703,329 A | | 11/1972 | Castellano |
| 5,251,048 A | | 10/1993 | Doane et al. |
| 5,695,682 A | | 12/1997 | Doane et al. |
| 5,796,447 A | * | 8/1998 | Okumura et al. .............. 349/74 |
| 5,875,012 A | * | 2/1999 | Crawford et al. .............. 349/74 |
| 6,028,649 A | * | 2/2000 | Faris et al. .................... 349/86 |
| 6,147,726 A | * | 11/2000 | Kubota et al. ................. 349/74 |

* cited by examiner

Primary Examiner—James A Dudek
(74) Attorney, Agent, or Firm—Raymond L. Owens

(57) ABSTRACT

A color display includes a substrate defining first and second opposite support surfaces. The first conductor is disposed over the first surface and defining a first pattern. A second conductor is disposed over the second surface and defining a second pattern. A first light modulating layer is disposed over the first conductor including a liquid crystal material having a chiral dopant selected so that regions can be placed in a state where colored light is reflected in a first portion of the spectrum. A second light modulating layer is disposed over the second conductor including a liquid crystal material having a chiral dopant selected so that regions can be placed in a state where colored light is reflected in a second portion of the spectrum. A third conductor is disposed over the first light modulating layer and defining a third pattern. A third light modulating layer is disposed over the third conductor including a liquid crystal material having a chiral dopant selected so that regions can be placed in a state where colored light is reflected in a third portion of the spectrum. A fourth conductor is disposed over the third light modulating layer and defining a fourth pattern. A fifth conductor is disposed over the second light modulating layer and defining a fifth pattern.

4 Claims, 4 Drawing Sheets

COLOR DISPLAY USING CHOLESTERIC LIQUID CRYSTALS

FIELD OF THE INVENTION

The present invention relates to color liquid crystal image displays using cholesteric liquid crystals.

BACKGROUND OF THE INVENTION

The existing art for color cholesteric liquid crystal displays is to stack three individual color planes each on individual base substrates, as shown in FIG. 1. The problem with this is that the color planes must be accurately aligned, an air gap will exist which creates optical losses which must be addressed and when such a display is flexed the flexing radius of each base substrate is significantly different that pixel alignment will be effected. Also, the base material and conductive ITO layers attenuate the light reflecting off the display and reduce the brightness of the display. The conductors are patterned so as to provide an array of pixels. For an example of electronic circuitry for driving such an array, see U.S. Pat. No. 5,251,048.

U.S. Pat. No. 3,703,329 is similar to FIG. 1 and shows a stacked three color display, which does not use cholesteric liquid crystal. The three color display has three cells each including a solution with pleochroic dye in a nematic liquid crystal composition. Each of the solutions can change its transmission of polarized white light in response to an electric field so as to change the color appearance of the solution. One solution can be changed in appearance from color less to magenta, another from colorless to cyan, and a third from colorless to yellow. The display applies an electric field separately to each of the solutions and passes polarized white light successively through each solution such that when electric field is provided across the pixel, a different color pixel is presented to the viewer. This arrangement has problems in that high optical losses are associated with the multiple glass substrates which prevents producing high quality images and the alignment of the pixels is a problem because pixels in each of the three cells must be accurately aligned to one another in the assembly process.

SUMMARY OF THE INVENTION

It is therefore an object of the present invention to provide a color display, comprising:

a) a substrate defining first and second opposite support surfaces;

b) a first conductor disposed over the first surface and defining a first pattern;

c) a second conductor disposed over the second surface and defining a second pattern;

d) a first light modulating layer disposed over the first conductor including a liquid crystal material having a chiral dopant selected so that regions can be placed in a state where colored light is reflected in a first portion of the spectrum;

e) a second light modulating layer disposed over the second conductor including a liquid crystal material having a chiral dopant selected so that regions can be placed in a state where colored light is reflected in a second portion of the spectrum;

f) a third conductor disposed over the first light modulating layer and defining a third pattern;

g) a third light modulating layer disposed over the third conductor including a liquid crystal material having a chiral dopant selected so that regions can be placed in a state where colored light is reflected in a third portion of the spectrum;

h) a fourth conductor disposed over the third light modulating layer and defining a fourth pattern;

i) a fifth conductor disposed over the second light modulating layer and defining a fifth pattern; and j) means for selectively applying voltages to different patterns of the first, second, third, fourth, and fifth conductors so fields are applied to selected regions of the first, second, and third light modulating layers to present a colored image to a viewer.

ADVANTAGES

The present invention has an improved feature in that all three color planes are coated onto a single base substrate, FIG. 2. Additionally, two of the color planes share a common conductive ITO layer, thus eliminating one layer of ITO. The ITO patterning process can be reduced from six setups to just three.

A single base substrate display reduces the light attenuation from multiple base substrates and results in a brighter display. The air gaps between color planes is eliminated resulting in less optical losses and a brighter display. The elimination of an ITO layer reduces light attenuation as well as lowers costs. Finally, pixel alignment can be more accurately maintained when the display is flexed.

DETAILED DESCRIPTION OF THE INVENTION

Throughout the specification, the liquid crystal which are used are chiral doped nematic liquid crystal, also known as cholesteric liquid crystal. For examples of such cholesteric liquid crystal, see U.S. Pat. No. 5,695,682. Applications of fields of various intensities and duration can change the state of chiral doped nematic materials from a reflective to a transmissive state. These materials have the advantage of maintaining a given state indefinitely after the removal of an applied field.

Figure 1:
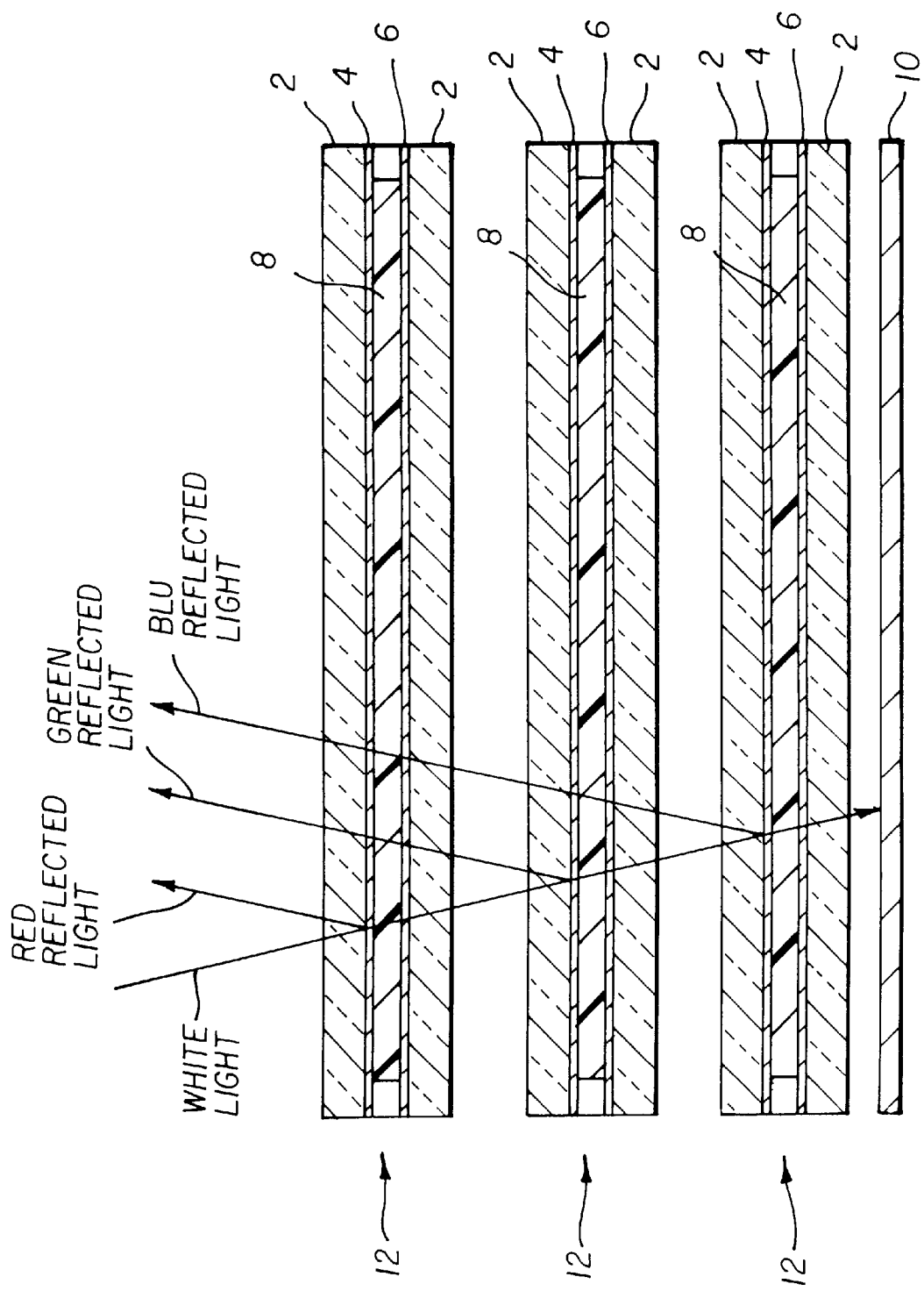
FIG. 1 depicts a cross sectional prior art color liquid crystal display.

FIG. 1 shows an existing prior art display. The display produces each color by separate display units 12, constructed from a sandwich of two glass substrates 2, glued at their perimeter with cholesteric liquid crystal material 8 encapsulated between the glass substrates 2 at a controlled thickness. The separate display units are separated from each other by air or a medium for matching indices of refraction. Common patterned ITO layer 4 and data patterned ITO layer 6 on the inner surfaces of the glass substrates 2 are selectively electrically driven to create voltage potentials at intersecting pixels thus selectively changing the cholesteric liquid crystal material 8 from transrnissive to reflective states. The display unit 12 for each color plane of red, green and blue are aligned and stacked together to give a full color display. A black light absorbing surface 10 is placed behind the last display unit 12. This type of display is costly because of the multiple display units 12 required and because of the alignment of the multiple display units 12. Further more each glass substrate 2 and ITO surface 4 tends to attenuate and scatter some percentage of the light, thus degrading the overall image quality.

Figure 2A:
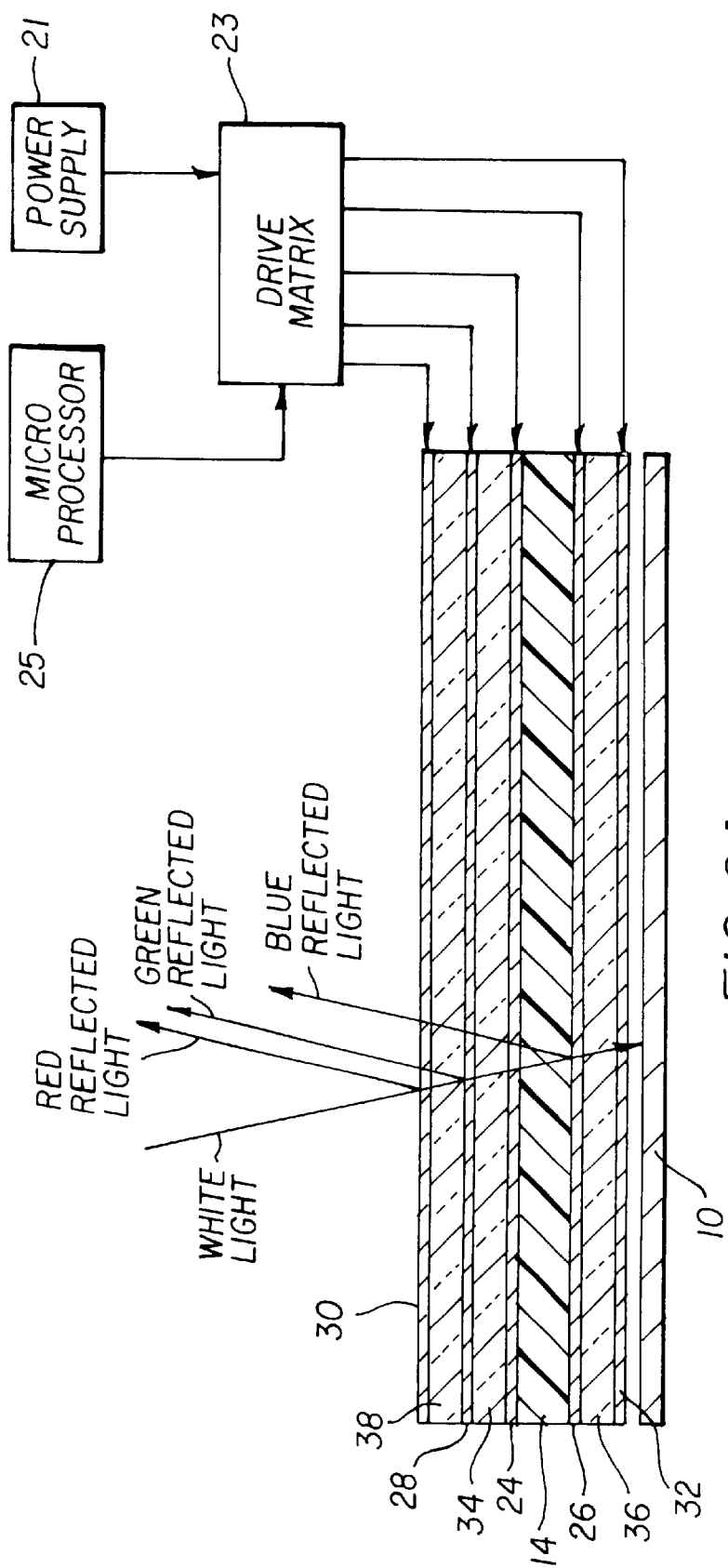
FIGS. 2A and 2B are cross sectional views of a display in accordance with the present invention.
Figure 2B:
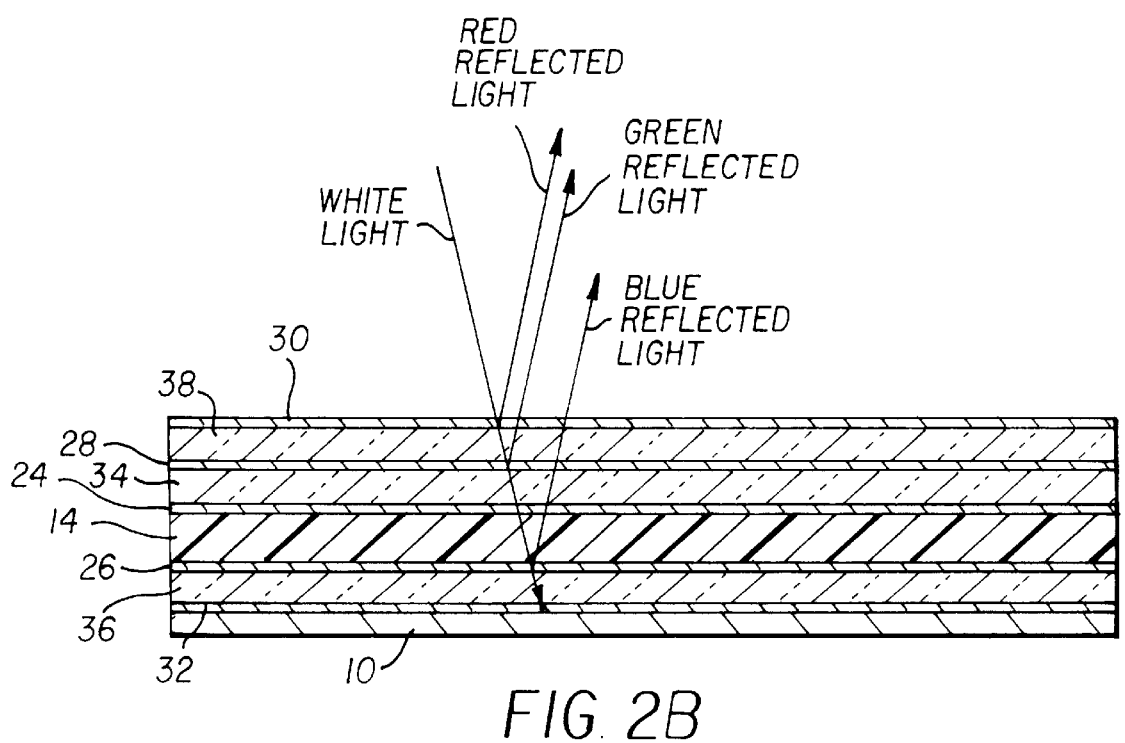

FIG. 2A and FIG. 2B show a cross section of displays in accordance with the invention. Where elements correspond, the same reference numerals will be used. A single clear flexible substrate 14, such as a polyester material, supports a first patterned ITO layer 24, a second patterned ITO layer 26, a third patterned ITO layer 28, a fourth patterned ITO layer 30, and a fifth patterned ITO layer 32. The first patterned ITO layer 24, the fourth patterned ITO layer 30, and the fifth patterned ITO layer 32 are data signal conductors for the electrical drive circuit. The second patterned ITO layer 26, and third patterned ITO layer 28 are common signal conductors for the electrical drive circuit. The clear flexible substrate 14 also supports a first light modulating layer 34, a second light modulating layer 36 and a third light modulating layer 38 all of which include, in a dispersion, cholesteric liquid crystal material in a gelatin binder. A black light absorbing surface 10 can be located behind the display unit 12 as in FIG. 2A or can be coated directly onto the display unit 12 as in FIG. 2B.

FIG. 1 (prior art), FIG. 2A and FIG. 2B show white light including fractions of red green and blue light, directed at the front surface of the display. As the light enters the cholesteric liquid crystal material 8 various fractions of the light related to the wavelength are reflected. This is caused by the pitch of the molecules, which are adjusted for a particular wave length of light by the addition of chiral dopant to the liquid crystal material to create a Bragg diffraction of that particular wave length of light. Application of electrical fields of various intensity and duration can change the state of the chiral doped liquid crystal material from a reflective state to a transmissive state. These materials have the advantage of maintaining a given state indefinitely after the electrical field is removed. In this way white light enters the display and is selectively reflected by various layers of chiral doped liquid crystals adjusted for different wave lengths of light and controlled by a matrixed electrical drive so as to create a color image.

In FIGS. 2A and 2B, the first patterned ITO layer 24 is a data signal conductor for the first light modulating layer 34. The fourth patterned ITO layer 30 is a data signal conductor for the third modulating layer 38, and the fifth patterned ITO layer 32 is a data signal conductor for the second modulating layer 36. The second patterned ITO layer 26, and the third patterned ITO layer 28, are common signal conductors. By selectively applying voltages to these data signal and common signal conductors, fields are applied to selected regions of the first light modulating layer 34, second light modulating layer 36, and third light modulating layer 38 so as to present a colored image to a viewer.

Figure 3A:
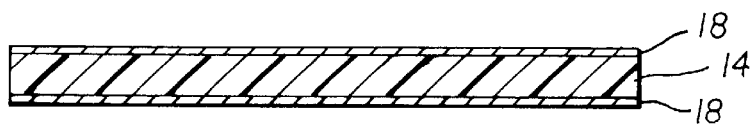
FIGS. 3A–3H depict various steps in the process of making the display shown in FIG. 2A and FIG. 2B.
Figure 3B:
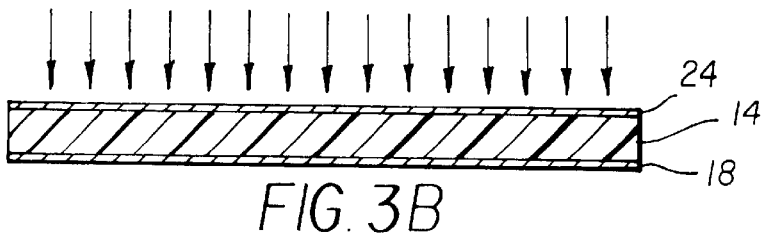
Figure 3C:
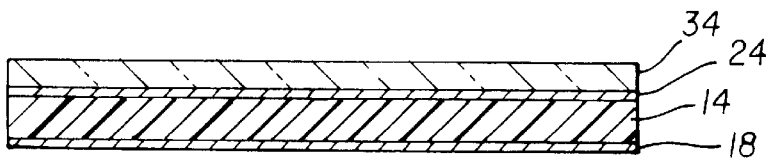
Figure 3D:
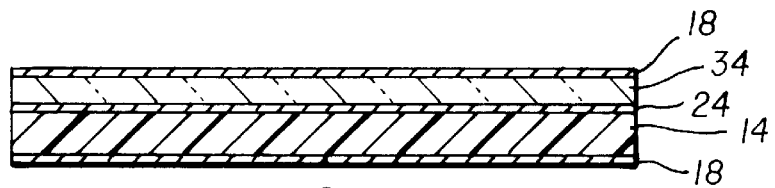
Figure 3E:
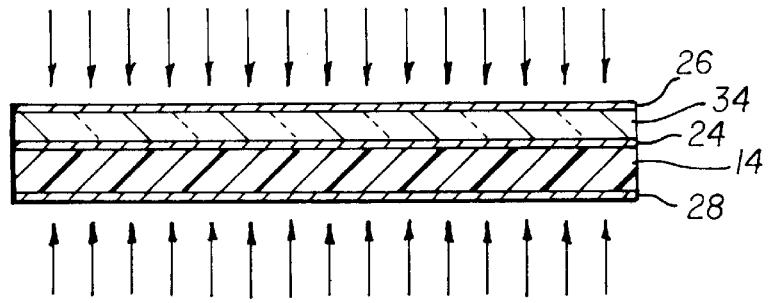
Figure 3F:
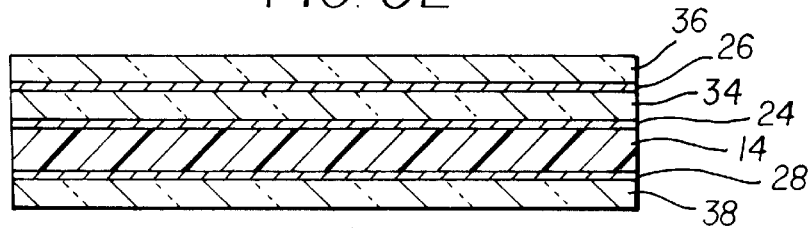
Figure 3G:
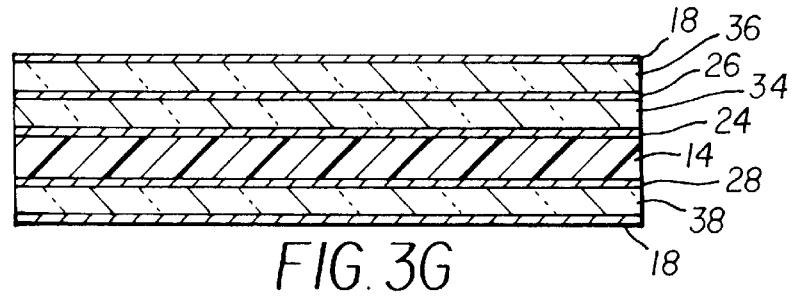
Figure 3H:
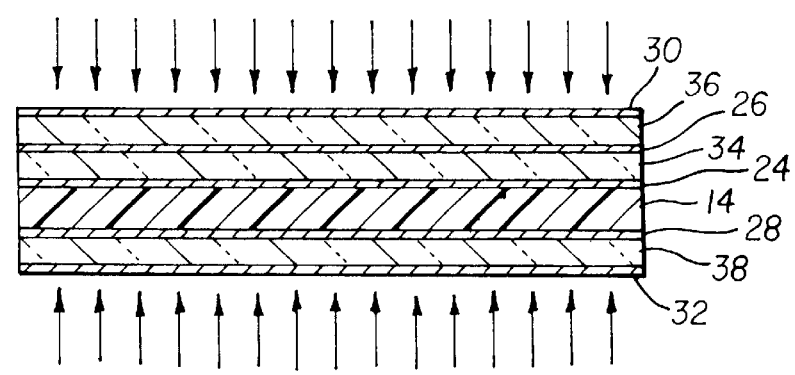

FIG. 3A through FIG. 3H shows the manufacturing steps for producing a single sheet color display. FIG. 3A shows a clear flexible substrate 14, which has an ITO layer 18 coated on both surfaces. This clear flexible substrate 14 could be in a cut sheet format but is preferably in a continuous web or roll form. FIG. 3B shows the first surface ITO layer 18 is laser patterned so as to be a data signal conductor this is the first patterned ITO layer 24. Reference features or marks in the clear flexible substrate 14 (not shown) are used to position the clear flexible substrate 14 in a laser patterning device, used to etch the ITO into conductive patterns. FIG. 3C shows that a first light modulating layer 34 has been coated over the first patterned ITO layer 24. This first light modulating layer 34 including a liquid crystal material having a chiral dopant selected so that regions can be placed in a state where colored light is reflected in a first portion of the spectrum. FIG. 3D shows an ITO layer 18 coated over top of the first light modulating layer 34. FIG. 3E shows both exposed ITO layers 18 are laser patterned so as to be common signal conductors, they are referred to as the second patterned ITO layers 26 and the third patterned ITO layer 28. Again reference features or marks in the clear flexible substrate 14 (not shown) are used to position the clear flexible substrate 14 in the laser patterning device. FIG. 3F shows the second patterned ITO layer coated with the second light modulating layers 36 and the third patterned ITO layer 28 is coated with the third light modulating layer 38. These second light modulating layer 36 and the third light modulating layer 38 include liquid crystal material having chiral dopants selected so that regions can be placed in a state where colored light is reflected in second and third portions of the spectrum. FIG. 3G shows the second light modulating layer 36 and the third light modulating layer 38 have been coated with an ITO layer 18. FIG. 3H shows both exposed ITO layers 18 are laser patterned so as to be data signal conductors, they are referred to as the fourth patterned ITO layers 30 and the fifth patterned ITO layer 32. Reference features or marks in the clear flexible substrate 14 (not shown) are used to position the clear flexible substrate 14 in the laser patterning device. The various ITO layers can be patterned by well known processes such as laser etching which ablates the ITO or, alternatively, photo chemical etching process can also be used.

Electrical drives made for applying different voltages across different layers having different cholesteric materials are well known in the art. See, for example, U.S. Pat. No. 5,251,048. In FIG. 2A, a representative drive circuit is shown. For simplicity, the drive circuit is not shown in FIG. 2B. A power supply 21 supplies voltages to an active drive matrix circuit 23, which is under the control of a microprocessor 25. The microprocessor 25 has been preloaded with information concerning the various colors to be provided by visual image produced by the display. The microprocessor 25 sends signals to the active drive matrix 23, which selectively applies voltages to different patterned ITO layers.

The invention has been described in detail with particular reference to certain preferred embodiments thereof, but it will be understood that variations and modifications can be effected within the spirit and scope of the invention.

PARTS LIST 2 glass substrates
4 common patterned ITO layer
6 data patterned ITO layer
8 cholesteric liquid crystal material
10 black light absorbing surface
12 display unit
14 clear flexible substrate
18 ITO layer
21 power supply
23 drive matrix
24 first patterned ITO layer
25 microprocessor
26 second patterned ITO layer
28 third patterned ITO layer
30 fourth patterned ITO layer
32 fifth patterned ITO layer
34 first light modulating layer
36 second light modulating layer
38 third light modulating layer

What is claimed is:

1. A color display, comprising:

a) a substrate defining first and second opposite support surfaces;

b) a first conductor disposed over the first surface and defining a first pattern;

c) a second conductor disposed over the second surface and defining a second pattern;

d) a first light modulating layer disposed over the first conductor including a liquid crystal material having a chiral dopant selected so that regions can be placed in a state where colored light is reflected in a first portion of the spectrum;

e) a second light modulating layer disposed over the second conductor including a liquid crystal material having a chiral dopant selected so that regions can be placed in a state where colored light is reflected in a second portion of the spectrum;

f) a third conductor disposed over the first light modulating layer and defining a third pattern;

g) a third light modulating layer disposed over the third conductor including a liquid crystal material having a chiral dopant selected so that regions can be placed in a state where colored light is reflected in a third portion of the spectrum;

h) a fourth conductor disposed over the third light modulating layer and defining a fourth pattern;

i) a fifth conductor disposed over the second light modulating layer and defining a fifth pattern; and j) means for selectively applying voltages to different patterns of the first, second, third, fourth, and fifth conductors so fields are applied to selected regions of the first, second, and third light modulating layers to present a colored image to a viewer.

2. The color display of claim 1 wherein the first, fourth, and fifth conductive patterns substantially correspond to each other and the second and third patterns substantially correspond to each other.

3. The color display of claim 1 wherein the selected voltage applying means includes means for receiving an input data signal representing a color image and means responsive to the input data signal for selectively applying voltages to the first, second, third, fourth, and fifth conductors so that different regions of the first, second, third, light modulating layers are disposed in reflective states.

4. The color display of claim 1 wherein the first, second, and third portions of the spectrum substantially correspond to red, green, and blue visible light.

* * * * *